March 10, 1942.  J. D. RYDER  2,276,096
TELEMETRIC CONTROL SYSTEM
Filed April 3, 1940  2 Sheets-Sheet 1

Inventor
JOHN D. RYDER
By Raymond D. Jumbiris
Attorney

Inventor
JOHN D. RYDER
By Raymond W. Jenkins
Attorney

Patented Mar. 10, 1942

2,276,096

UNITED STATES PATENT OFFICE 2,276,096

TELEMETRIC CONTROL SYSTEM

John D. Ryder, Pepper Pike Village, Ohio, assignor to Bailey Meter Company, a corporation of Delaware Application April 3, 1940, Serial No. 327,656

8 Claims. (Cl. 172—239)

This invention relates generally to telemetric control systems for controlling or maintaining a dependent variable in correspondence with an independent variable. The variables may be the same, as for example fluid rate of flow, pressure, temperature, electromotive force, or humidity; or they may be different, for example, one may be fluid rate of flow and the other temperature or position. More particularly my invention relates to telemetric control systems of this type for maintaining a dependent variable in correspondence with a non-linear function of the independent variable.

In accordance with my invention periodic electric impulses of a time length corresponding to an indeterminate arbitrary function of the independent variable, different than the non-linear function with which the dependent variable is desirably maintained in correspondence, originate at a first transmitting station. In consonance with these impulses similar electric impulses originate at a second transmitting station of a time length corresponding to an indeterminate non-linear function of the dependent variable differing from the first indeterminate function by the non-linear function it is desired to maintain between the independent and dependent variables. By means hereinafter described when the dependent variable stands in desired non-linear relation to the independent variable the impulses originating in the two transmitting stations are of equal length. When other than this condition exists suitable receiver means operated by the difference in time length of concurrent impulses acts to vary the magnitude of the dependent variable until concurrent impulses originating in the first and second transmitting stations are again equal.

Figure 4:
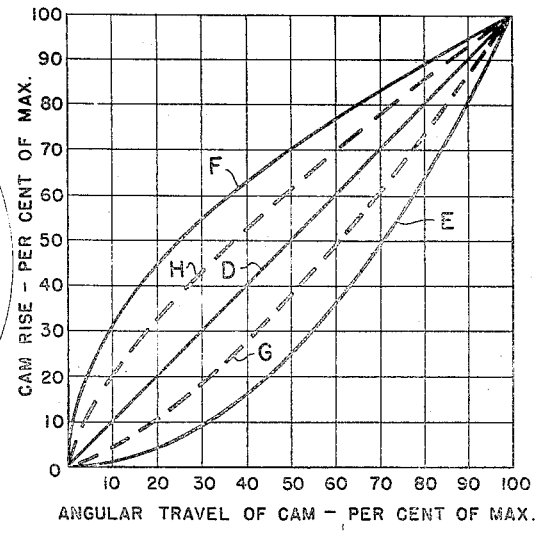

Fig. 4 graphically illustrates various cam contours.

Figure 5:
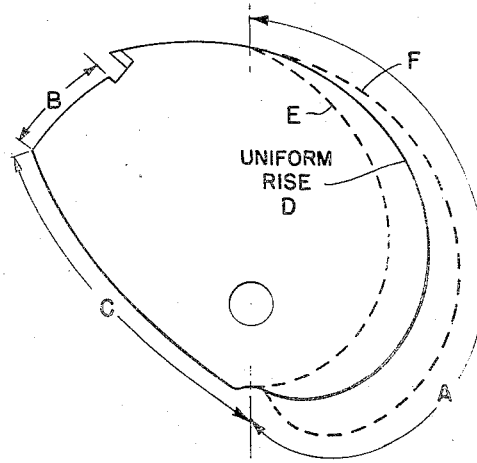
Figure 7:
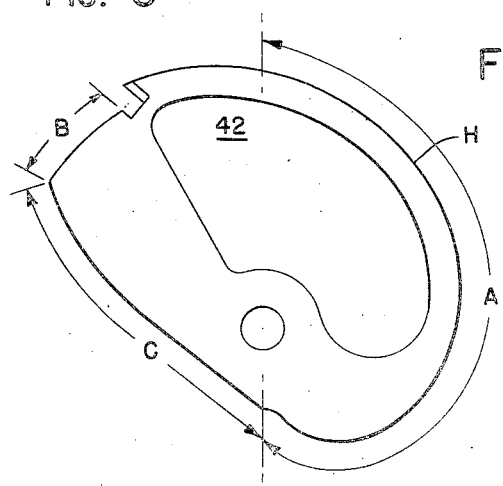
Figure 6:
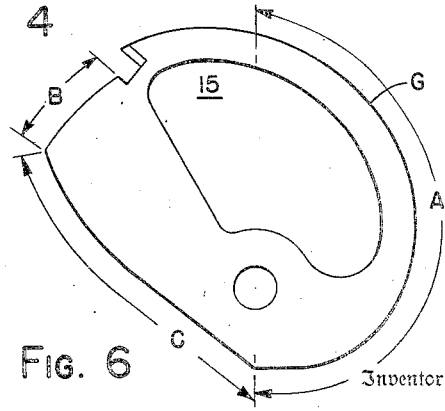

Figs. 5, 6 and 7 are illustrations of cams having diverse shapes and characteristics.

In my copending application, Ser. No. 145,277, filed in the United States Patent Office on May 28, 1937, now Patent No. 2,211,711, of which this application is a continuation-in-part, I disclose and describe a telemetric control system somewhat similar to that herein illustrated and described.

Figure 1:
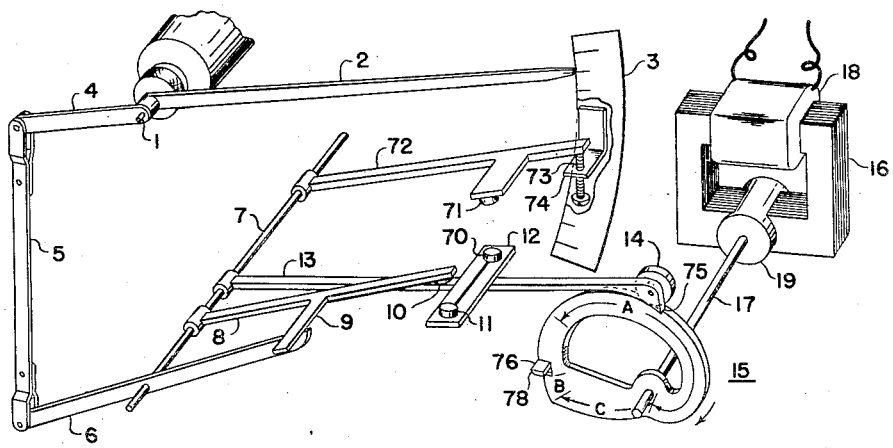
Fig. 1 illustrates somewhat diagrammatically a transmitting mechanism for originating periodic electric impulses or signals corresponding to the value of a variable.

Referring to the drawings, in Fig. 1 I have shown a transmitting station for originating periodic impulses corresponding to the value of an independent variable. In the transmitting station is a spindle 1 angularly positioned by a device (not shown) responsive to the independent variable with which the dependent variable is desirably maintained in correspondence. For example, the spindle 1 may be positioned by a rate of flow meter sensitive to the differential pressure produced by an orifice or other primary element and varying in known non-linear relation to the rate of fluid flow therethrough, or it may be positioned by a Bourdon tube sensitive to pressure or temperature.

Figure 2:
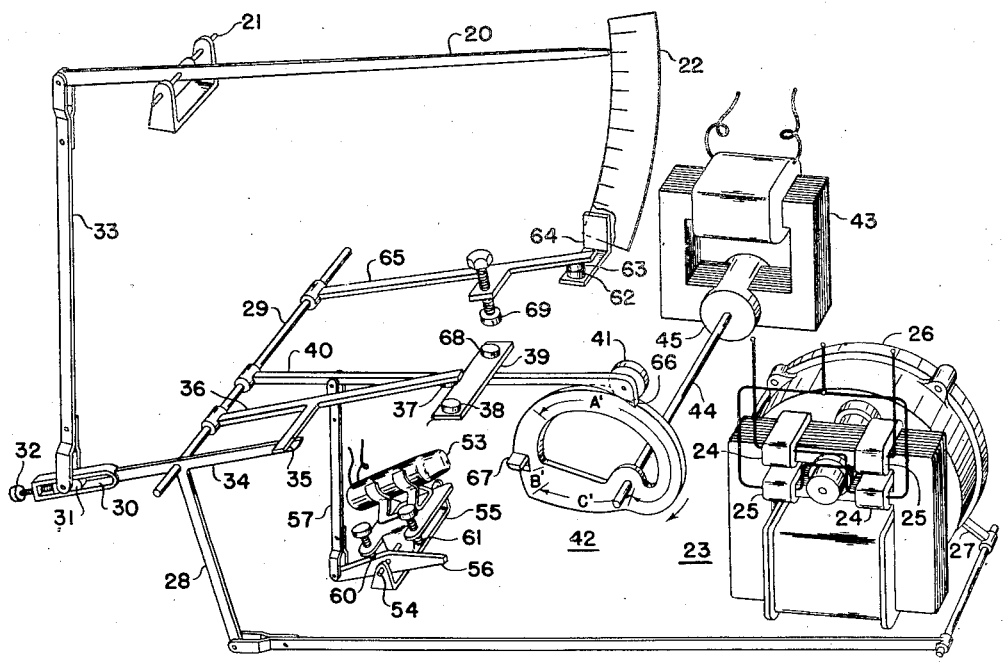
Fig. 2 illustrates a similar transmitting mechanism and a receiver mechanism mechanically coupled thereto for altering the value of the variable.

In Fig. 2 I have shown a transmitting station for originating periodic impulses corresponding to the value of a dependent variable, which in connection with the specific embodiment of my invention illustrated may be considered as the position of the index 20. Mechanically connected to the index 20 and adapted to alter the position thereof is a receiver mechanism jointly under the electrical control of the transmitting stations shown in Figs. 1 and 2.

Referring now to Fig. 1, secured to the spindle 1 is an index 2 which in cooperation with a suitably graduated scale 3 gives an indication of the magnitude of the independent variable. Likewise secured to the spindle 1 is an arm 4 pivotally connected through a link 5 to a transmitting arm 6 angularly positioned about a shaft 7. Angular movements of the spindle 1 are, therefore, mechanically transmitted to the arm 6. Also mounted on the shaft 7 is a member 8 having a projection 9 normally resting by gravity on the arm 6. As the arm 6 is positioned about the shaft 7 the member 8 is also positioned through the agency of the projection 9.

Carried by the member 8 is a contact 10 arranged to engage a cooperating contact 11 secured to a plate 12 mounted on a follower arm 13, one end of which is pivotally supported by the shaft 7. The opposite end of the follower 13 is provided with a pin on which is rotatably mounted a cam follower 14 engaging the contour of a cam 15, continuously rotated in the direction of the arrow by a synchronous motor 16 through a shaft 17. The motor 16 is energized through a field winding 18 which may be connected to any suitable source of alternating current and is provided with an integral gear reduction unit 19, so that the shaft 17 rotates at a relatively low speed.

The follower 13, through the cam 15, is periodically oscillated between predetermined limits. At some point in its travel, depending upon the position of the arm 6, the member 8 is picked up and carried to the upper travel limit, whence the member 8 is returned to its normal position when the extension 9 engages the arm 6.

The rising section of the cam 15 designated by the angle A in Fig. 1 is substantially uniform, so that the increment of time during which the contact 10 is in engagement with the contact 11 while the follower 14 engages this section of cam 15 bears a functional relation to the magnitude of the variable angularly positioning of the spindle 1.

In the transmitting station shown in Fig. 2 the index 20, which is supported by a shaft 21, cooperates with a suitably graduated scale 22 to give a visual indication of the value of the dependent variable. The value of the dependent variable (position of the index 20) is adapted to be varied by a receiver station comprising a motor 23 having opposed wound split shading poles 24 and 25. If the pole 24 is short circuited the motor 23 rotates in one direction. If the pole 25 is short circuited the motor rotates in the opposite direction. With both poles simultaneously energized or deenergized the motor is not urged to rotation. The motor 23 is provided with a gear reduction 26 so that a crank arm 27 positioned by the output shaft of the gear reduction moves through a relatively small angle for a large angular motion of the motor.

The crank arm 27 positions the index 20 through a receiving arm 28 pivoted on a shaft 29 and provided with a slot 30. A block 31 adjustable radially with respect to the shaft 29 by a screw 32 is guided in the slot 30 and is pivotally connected to a link 33 likewise pivotally connected to the index 20. Movement of the block 31 toward the shaft 29 serves to decrease the angular motion of the index 20 for a given angular motion of the crank 27. Conversely movement of the block 31 away from the shaft 29 serves to increase the movement of the index 20 for a given movement of the crank 27. Through the agency of this adjustment any desired angular travel of the index 20 may be obtained for a given angular travel of the index 2.

The receiving arm 28 is provided with an extension 34 upon which normally rests by gravity an extension 35 of a member 36 movably mounted on the shaft 29. Carried by the member 36 is a contact 37 arranged to engage a cooperating contact 38 secured to a plate 39 mounted on a follower arm 40 pivoted about the shaft 29. The arm 40 through a rotatable follower 41 is periodically oscillated between predetermined limits by a cam 42 continuously rotated by a self-starting synchronous motor 43 through a shaft 44. The motor 43 is similar to the motor 16 and is provided with an integral gear reduction 45 so that cams 15 and 42, identical in contour, rotate in synchronism with each other. The cam 42 is provided with a rising section A' similar to section A of cam 15, so that the increment of time during which contact 37 is in engagement with contact 38, while the follower 41 engages section A' bears a functional relation to the position of the index 20.

Figure 3:
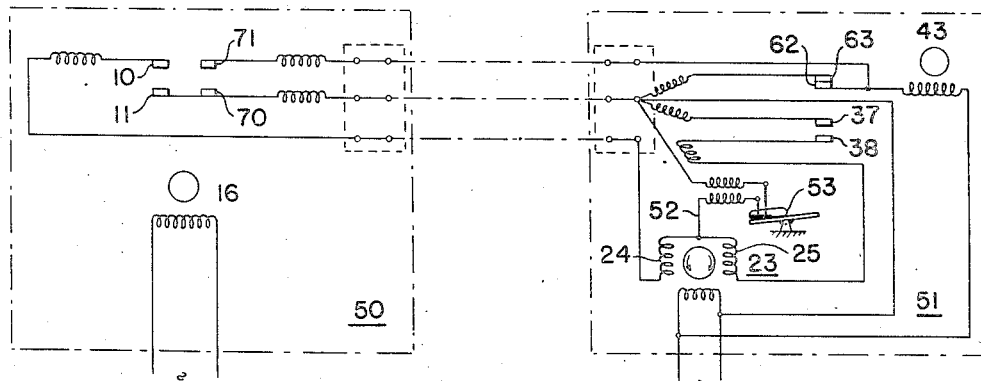
Fig. 3 is a wiring diagram of the transmitting and receiving mechanisms shown in Figs. 1 and 2.

Referring to Fig. 3, the transmitter of the independent variable is generally indicated at 50 while the transmitter of the dependent variable and receiver means is generally indicated at 51. When contacts 10, 11 engage, the pole winding 24 of motor 23 is short circuited, thereby tending to produce rotation in one direction. Similarly when contacts 37, 38 engage, winding 25 of motor 23 is short circuited, tending to produce rotation in the opposite direction. When the position of index 20 agrees with that of index 2, contacts 10, 11 and 37, 38 engage at the same instant and motor 23 remains stationary. If the index 2 is positioned downwardly a predetermined amount by the spindle 1, then contacts 10, 11 will engage prior to engagement of contacts 37, 38 and motor 23 will rotate in a direction to position the receiving arm 28 in a clockwise direction, so that index 20 is positioned downwardly. Until indices 2 and 20 are brought into proper correspondence contacts 10, 11 will continue to engage prior to contacts 37, 38 and during each cycle of operation motor 23 will operate to position the receiving arm 28 in a clockwise direction until proper correspondence is restored. Conversely, if the index 2 is positioned upwardly, then contacts 37, 38 will engage prior to contacts 10, 11 and the motor 23 will rotate to position the receiving arm 28 in a counterclockwise direction, thereby positioning the index 20 upwardly and such upward positioning will continue for an increment of each cycle of operation until proper correspondence is restored.

The windings 24, 25 are shown connected to a common neutral 52, in which is located a mercury switch 53. As shown in Figs. 2 and 3 the mercury switch 53 is in closed position. However, upon the follower 40 being positioned upwardly to the termination of the cam section A' the mercury switch 53 is thrown to open position, thereby simultaneously open circuiting the windings 24, 25 notwithstanding that contacts 10, 11 and 37, 38 remain engaged. As shown in Fig. 2 the mercury switch 53 is pivotally supported on a shaft 54 mounted in a stationary bracket 55. Likewise supported on the shaft 54 is a beam 56 pivotally connected to the arm 40 through a link 57. Mounted in the base of the mercury switch 53 are adjustable screws 60 and 61 arranged to engage the beam 56. The screws 60 and 61 are adjusted so that upon the mercury switch 53 being thrown to open position it will remain open until the follower approaches the origin of the rising section A' when it is restored to the closed position, so that windings 24 and 25 will be energized upon engagement of contacts 10, 11 and 37, 38 respectively.

It is apparent from the foregoing description of the operation of mercury switch 53 that the shape of cams 15 and 42 after the terminus of rising sections A and A' respectively are passed has no effect upon the operation of motor 23, for regardless of when the contacts 10, 11 and/or 37, 38 disengage the motor remains stationary as the neutral has been opened. The windings 24, 25 are therefore only short circuited through contacts 10, 11 and 37, 38 respectively, whereas they are open circuited through mercury switch 53. As known, contacts such as 10, 11 and 37, 38 when used to deenergize a circuit may cause sparking, which is not only injurious to the contacts but, if surrounded by an explosive atmosphere, may cause serious explosions. Engagement of contacts 10, 11 and 37, 38 energizing the windings 24 and 25 creates negligible sparking. The mercury switch 53 is confined within a controlled atmosphere so that sparking occurring therein in no way disturbs the operation of the system or gives rise to explosion hazards.

As hereinbefore stated, cams 15 and 42 operate in synchronism and in exact phase, so that the point on the contour of cam 42 engaged by follower 41 agrees exactly with the point on the contour of cam 15 engaged by follower 14. When initially placing the device in operation, or after a power failure, a phase displacement between cams 15 and 42 may exist. To restore the desired phase I provide means for comparing the position of cam 42 once each revolution with the position of cam 15, and if displaced therefrom retarding the motor 43 until proper phase is restored. Once restored cams 15, 42 will remain in phase inasmuch as in the preferred embodiment they are driven by similar synchronous motors.

The motor 43 is normally energized through closed contacts 62, 63. A bracket 64 supports the contact 62, whereas the contact 63 is carried by a member 65 pivotally mounted on the shaft 29. Once each revolution of the cam 42 an extension 66 on the arm 40 engages a laterally extending lip 67 on cam 42. Such engagement causes the roller 41 to be raised above the cam 42 and for an anvil 68 to engage an adjustable screw 69 carried by the member 65. The member 65 is then oscillated about shaft 29 sufficient to cause disengagement of contacts 62, 63, thereby opening the circuit normally energizing the motor 43.

Connected in parallel with contacts 62, 63 are contacts 70, 71. The contact 70 is carried by the plate 12, whereas the contact 71 is carried by a member 72 pivotally mounted on shaft 7 and normally supported at the opposite end by an adjustable screw 73 carried by a fixed bracket 74. The member 13 is provided with a projection 75 arranged to engage a lip 76 on cam 15. Engagement of the projection 75 with the lip 76 raises the member 13 sufficiently so that contact 70 engages contact 71, thereby serving to energize the motor 43.

If cams 15, 42 are in phase, contacts 70, 71 will engage at the instant contacts 62, 63 disengage, and contacts 62, 63 will reengage at the instant contacts 70, 71 disengage, thereby effecting continuous energization of the motor 43. Should the cam 42 lead the cam 15, contacts 62, 63 will open before contacts 70, 71 engage and the motor 43 will be deenergized for a short interval each revolution of cam 42, retarding the same a small amount at each operation until the opening of contacts 62, 63 occurs at the instant contacts 70, 71 close and cams 42, 15 are brought into phase. If cam 42 lags cam 15, contacts 62, 63 will remain open after the contacts 70, 71 have disengaged, interrupting the receiver motor circuit every revolution until cam 42 is sufficiently retarded so that motor 43 will not coast to a closed position of contacts 62, 63. Cam 42 will then be stationary for one revolution of cam 15, or until contacts 70, 71 again close, at which time the motor 43 will be energized and cam 42 will lead cam 15. Thereafter motor 43 will be deenergized for a short interval in each revolution of cam 42 until proper phase relationship is again restored.

In the embodiment of my invention illustrated and described I have indicated that the rising sections A and A' of cams 15 and 42 are so shaped that a functional relation exists between positioning of index 2 and index 20. If the dependent variable is to be maintained in linear proportion to the independent variable then the rising sections A and A' will have uniform and similar slopes. In Fig. 4 I have illustrated graphically by means of curve D this relationship between cam rise and angular travel of the cams 15 and 42 when a linear relationship is to be maintained between the dependent and independent variables.

In some applications of my invention it is essential or a distinct advantage to have a dependent variable maintained in non-linear relationship to the independent variable. For example, if the independent variable is the differential pressure produced by an orifice or other type of primary element for measuring rate of flow, the dependent variable is usually preferably maintained in linear relationship to rate of flow rather than in linear relationship to the differential pressure. Unless special means are provided to extract the square root of the differential pressure, it follows that the index 2 will be positioned in linear proportion to the differential pressure, and if the sections A and A' of cams 15 and 42 are provided with uniform and similar slopes the index 20 will likewise be positioned in linear proportion to the differential pressure or in accordance with the square of the rate of flow. If, as specifically illustrated, the index 20 is used to give a visual indication of the rate of flow the scale 22 (assuming the index 20 is positioned in linear proportion to differential pressure) will have crowded graduations at the lower readings and highly expanded graduations at the upper readings. This will be evident from a consideration of the fact that 10% of maximum flow produces but 1% of the maximum differential pressure. Likewise if the dependent variable is a condition or quantity, such as pressure, temperature, humidity or rate of flow to be maintained in linear correspondence with the rate of flow producing the differential pressure it is evident that some means must be provided for extracting the square root relationship, otherwise the dependent variable will be maintained in linear proportion to the differential pressure rather than to rate of flow. While I shall specifically describe an embodiment of my invention whereby the dependent variable is maintained in correspondence with the square root of the independent variable it will be evident that it may be employed to control a dependent variable in correspondence with any desired non-linear function of an independent variable.

I am aware that the need and advantages of having a telemetric control system wherein the dependent variable is maintained in non-linear relationship to an independent variable has long been recognized and various expedients proposed for accomplishing this result. For example, the cam 15 might be given a square root contour so that the periodic impulses correspond to the square root of the position of the index 2. Similarly the cam 42 might be given a contour varying as the second power so that the periodic impulses would correspond to the square of the position of the index 20. In following either of these suggestions the remaining cam would have a uniform or straight line slope. While theoretically such expedients might appear satisfactory, they present serious practical difficulties. For example, if the cam 15 is given a square root contour but 1% of the total cam rise occurs during the first 10% of angular travel, whereas 19% of the total cam rise occurs during the last 10% of angular travel. It is evident that minute irregularities in the cam shape during the first part of the angular travel will cause material errors in the impulses transmitted. Again if the cam 42 is given a contour varying as the second power then 10% of the total cam rise will occur in the first 1% of angular travel of the cam. Thus the rate of rise during the first part of the angular travel will be such as to put an exceptionally heavy burden on the motor 43, which may cause erratic operation and hence destroy the accuracy of the system. Slight errors in the slope of the cam will also cause material errors in the impulses transmitted.

In Fig. 4 I have graphically illustrated by curve E the contour of cam 15, when the square root relationship between the independent and dependent variables is extracted thereby. Curve F illustrates the contour of the cam 42 when the square root relationship is extracted by providing this cam with a contour varying as the second power. In the former case the cam 42 will have a contour corresponding to curve D, whereas in the latter case the cam 15 will have a contour corresponding to the curve D.

In Fig. 5 I have shown a cam which may be taken as either the cam 15 or 42 having a uniform slope, and also superimposed thereon a contour corresponding to curves E and F of Fig. 4. It will be noted that with either of the latter contours the slopes at the lower percentages of angular travel over the rising section A are such as to make manufacture of the cams difficult and render the initial and sustained accuracy of the system problematical.

In accordance with my invention, as distinguished over the systems of the prior art, I shape the cams 15 and 42 so that the impulses originated by either transmitter correspond to no determinable mathematical function, either of the independent or dependent variables. It may be said in general that my system is characterized by the fact that the non-linear function is partially extracted in the transmitter of the independent variable, and the remainder in the transmitter of the dependent variable. Thus by splitting, so to speak, the operation of extracting the function between the two transmitters I am able to provide both with cams having reasonable slopes and shapes.

Referring to Fig. 4, I have indicated by curves G and H two possible complementary contours for cams 15 and 42 respectively, that will cause the index 20 to be positioned in correspondence with the square root of the positioning of the index 2. Curve G may be selected solely by inspection, due consideration being given to the fact that the curve H will necessarily differ therefrom in accordance with the non-linear function of the independent variable to which the dependent variable is to correspond. Thus in the specific example described, when the square root relationship is being extracted it will be noted that the values of curve H differ from the values of curve G at any given angular travel of the cams in accordance with the square root relationship between the independent and dependent variables. In other words, the curve H bears the same relation to the curve G as the curve D bears to the curve E. Either the curve G or the curve H need not, and preferably does not, bear any determinable mathematical relationship to the non-linear function between the independent and the dependent variables; but their slopes are chosen to give complementary cam shapes resulting in the best performance of the telemetric control system.

In Fig. 6 I have shown the cam 15 having a contour corresponding to curve G and in Fig. 7 I have shown the cam 42 having a contour corresponding to curve H. The contours illustrated should be taken as merely representative of an infinite number of contours these cams may have to maintain any given non-linear function between the independent and dependent variables.

While in accordance with the patent statutes I have described a specific embodiment of my invention I desire it to be understood that I am not to be limited thereby except as to the claims in view of the prior art.

What I claim as new, and desire to secure by Letters Patent of the United States, is:

1. A telemetric system for controlling a dependent variable in accordance with the non-linear function of an independent variable, comprising in combination, an independent variable means, a dependent variable means, a first transmitting station comprising a member positioned in linear proportion to the independent variable means and a cyclically operable cam for periodically originating electrical impulses corresponding to an indeterminable function of the independent variable means, a second transmitting station comprising a member positioned in linear proportion to the dependent variable means and a cyclically operable cam for periodically originating electrical impulses in unison with said first named impulses corresponding to an indeterminable function of the dependent variable means, said last named cam being so shaped relative to said first cam that when the dependent variable means corresponds to the value of the non-linear function for the then existing value of the independent variable means said impulses are equal, and receiver means under the joint control of said impulses adapted to alter the value of the dependent variable means to maintain said impulses equal.

2. A telemetric system for controlling a dependent variable in accordance with the square root of an independent variable, comprising in combination, an independent variable means, a dependent variable means, a first transmitting station comprising a member positioned in linear proportion to the independent variable means, a rotatable cam, means for rotating said cam at substantially constant speed, means cooperating with said cam and member so that upon each revolution of said cam an electric impulse is originated, said cam so shaped that the duration of said impulses corresponds neither to a square root function of said independent variable means or to a linear function thereof, but to a mathematically indeterminate function lying between said first two functions, a second transmitting station comprising a member positioned in linear proportion to the dependent variable means, a rotatable cam, means for rotating said cam at substantially constant speed and means cooperating with said cam and member so that upon each revolution of said cam an electric impulse is originated, said cam so shaped that the duration of said impulses differ in duration from the impulses originated by said first transmitter in proportion to the square root of the independent variable means when said independent variable means and dependent variable means are in linear proportion; and receiver means under the joint control of said impulses and adapted to alter said dependent variable means to maintain said impulses of equal duration.

3. A telemetric control system for controlling a dependent variable in accordance with a non-linear function of an independent variable comprising in combination, an independent variable means, a dependent variable means, a first transmitting station comprising a member positioned in linear proportion to the independent variable means, a rotatable cam, means for rotating said cam at substantially constant speed, and means cooperating with said cam and member so that upon each revolution of said cam an electric impulse is originated, a second transmitting station comprising a member positioned in linear proportion to the dependent variable means, a rotatable cam, means for rotating said cam at substantially constant speed, and means cooperating with said cam and member so that upon each revolution of said cam an electric impulse is originated, said cams having complementary shapes so that the non-linear function is partially extracted in the first transmitter means and the remainder extracted in the second transmitter means, and such that said impulses are equal when the dependent variable means corresponds in value to the value of the non-linear function for the then existing value of the independent variable means, and receiver means under the joint control of said impulses and adapted to alter the value of the dependent variable means to maintain said impulses equal.

4. A telemetric control system for controlling a dependent variable in accordance with the square root of an independent variable comprising in combination, an independent variable means, a dependent variable means, a first transmitting station comprising a member positioned in linear proportion to the independent variable means, a rotatable cam, means for rotating said cam at substantially constant speed and means cooperating with said cam and member so that upon each revolution of said cam an electric impulse is originated, a second transmitting station comprising a member positioned in linear proportion to the dependent variable means, a rotatable cam, means for rotating said cam at substantially constant speed, and means cooperating with said cam and member so that upon each revolution of said cam an electric impulse is originated, said cams having complementary shapes so that the square root relation is partially extracted in the first transmitting means, and the remainder in the second transmitting means and such that said impulses are equal when the dependent variable means corresponds in value to the square root of the independent variable means, and receiver means under the joint control of said impulses and adapted to alter the value of the dependent variable means to maintain said impulses equal.

5. A telemetric control system for controlling a dependent variable in accordance with a non-linear function of an independent variable, comprising in combination, a first movable element positioned representative of the independent variable, a second movable element positioned representative of the dependent variable, means for cyclically telemetering signals of a duration corresponding to an irregular non-linear function of the position of said first element, a second transmitting means for cyclically telemetering signals of a duration corresponding to an irregular non-linear function of the position of said second element differing from said first irregular function by the non-linear function between the independent and dependent variables, receiver means under the joint control of said signals, and means under the control of said receiver means for positioning said second movable element to maintain said signals of equal duration.

6. A telemetric control system for controlling a dependent variable in accordance with the non-linear function of an independent variable, comprising in combination, a first movable element positioned representative of the independent variable, a second movable element positioned representative of the dependent variable, a first transmitting means including a cam having an arbitrary shape for cyclically telemetering signals corresponding to an irregular non-linear function of the position of said first movable element, a second transmitting means including a cam for cyclically telemetering signals corresponding to an irregular non-linear function of the position of said second movable element differing from the first irregular function by the non-linear functional relation between the independent and dependent variables, and receiver means jointly responsive to said signals and adapted to position said second movable element to maintain the signals from said second transmitting means equal in duration to those transmitted from the first transmitting means.

7. A telemetric control system for controlling a dependent variable in accordance with the non-linear function of an independent variable, comprising in combination, a first movable element positioned representative of the independent variable, a second movable element positioned representative of the dependent variable, means for periodically telemetering signals of a time duration corresponding to a non-linear function of the position of said first element, means for periodically telemetering signals of a time duration corresponding to a non-linear function of the position of said second element, said second and last named non-linear functions differing by the non-linear function between said independent and dependent variables, and receiver means under the joint control of said signals and adapted to alter the position of said second movable element to maintain the time duration of said signals equal.

8. A telemetric control system for controlling a dependent variable such as the position of a first member in correspondence with the position of a second member whose position is representative of the square root of an independent variable such as pressure, comprising in combination, a first transmitting station including a member positioned in linear relation to the independent variable, a rotatable cam, means for rotating said cam at substantially constant speed, and means cooperating with said cam and member so that upon each revolution of said cam an electric impulse is originated, said cam so shaped that the duration of the impulses bear a relation to the independent variable lying between a square root and a linear relation, a second transmitting station including a second member positioned in linear relation to the dependent variable, a rotatable cam, means for rotating said cam at substantially constant speed, means cooperating with said cam and second member so that upon each revolution of said cam an electric impulse is originated, said cam so shaped that the duration of the impulses are equal to the duration of the first impulses when the dependent variable corresponds in the value to the square root of the then existing value of the independent variable, receiver means under the joint control of said impulses, and means under the control of said receiver means for positioning said second member to maintain the duration of the impulses from the second transmitting station equal to those from the first transmitting station.

JOHN D. RYDER.